US 10,260,627 B2

(12) United States Patent
Lacher

(10) Patent No.: US 10,260,627 B2
(45) Date of Patent: Apr. 16, 2019

(54) HYDRAULIC BRAKE

(71) Applicant: Clark Equipment Company, West Fargo, ND (US)

(72) Inventor: Robert R. Lacher, Bismarck, ND (US)

(73) Assignee: Clark Equipment Company, West Fargo, ND (US)

(*) Notice: Subject to any disclaimer, the term of this patent is extended or adjusted under 35 U.S.C. 154(b) by 465 days.

(21) Appl. No.: 14/539,333

(22) Filed: Nov. 12, 2014

(65) Prior Publication Data

US 2015/0128580 A1 May 14, 2015

Related U.S. Application Data

(60) Provisional application No. 61/903,133, filed on Nov. 12, 2013.

(51) Int. Cl.
*F16H 61/4157* (2010.01)
*F15B 11/044* (2006.01)
(Continued)

(52) U.S. Cl.
CPC ......... *F16H 61/4157* (2013.01); *E02F 9/128* (2013.01); *E02F 9/2203* (2013.01);
(Continued)

(58) Field of Classification Search
CPC ... F15B 11/044; F15B 11/0445; F15B 11/048; F15B 2211/715; F15B 2211/50581;
(Continued)

(56) References Cited

U.S. PATENT DOCUMENTS 3,922,855 A 12/1975 Bridwell et al.
4,074,528 A 2/1978 Lourigan et al.
(Continued)

FOREIGN PATENT DOCUMENTS

EP 0056865 A1 8/1982
WO 2006014337 A2 2/2006

OTHER PUBLICATIONS

International Search Report and Written Opinion from the European Patent Office dated Feb. 18, 2015 for corresponding International Application No. PCT/US2014/065208, filed Nov. 12, 2014.
(Continued)

*Primary Examiner* — Michael Leslie
*Assistant Examiner* — Michael Quandt
(74) *Attorney, Agent, or Firm* — John D. Veldhuis-Kroeze; Westman, Champlin & Koehler, P.A.

(57) ABSTRACT

A hydraulic brake mechanism for use in hydraulic systems to provide braking of a hydraulic motor is disclosed. The brake mechanism provides proper braking under a range of operating conditions, including (1) the start of flow from the pump to the brake and motor and braking is not desired; (2) operating conditions in which constant flow is provided from the pump to the brake and motor and braking is not desired; (3) operating conditions in which abrupt decreases of flow from the pump to the brake and the motor occur, for example where flow is reduced due to being drawn by another work element or hydraulic load, but under which a reduced supply flow is still present and braking is not desired; and (4) operating conditions in which the hydraulic flow from the pump to the brake mechanism and the motor is shut off completely and braking is desired.

19 Claims, 3 Drawing Sheets

(51) Int. Cl.
  *E02F 9/12* (2006.01)
  *E02F 9/22* (2006.01)

(52) U.S. Cl.
  CPC ............ *E02F 9/226* (2013.01); *E02F 9/2225* (2013.01); *F15B 11/0445* (2013.01); *F15B 2211/7058* (2013.01)

(58) Field of Classification Search
  CPC ........ F15B 2211/755; F15B 2211/7058; F15B 13/01; E02F 9/226; E02F 9/128; F16H 61/4157
  See application file for complete search history.

(56) References Cited

U.S. PATENT DOCUMENTS

| | | | |
|---|---|---|---|
| 4,171,054 A | 10/1979 | Tanaka et al. | |
| 4,210,061 A | 7/1980 | Bianchetta | |
| 4,301,713 A | 11/1981 | Cobb et al. | |
| 4,552,503 A | 11/1985 | Mouri et al. | |
| 4,569,272 A * | 2/1986 | Taylor | F15B 13/02 137/625.62 |
| 5,313,795 A | 5/1994 | Dunn | |
| 5,713,189 A | 2/1998 | Toman | |
| 5,822,960 A * | 10/1998 | Kitamura | A01D 75/30 56/10.2 H |
| 7,162,869 B2 | 1/2007 | Yoshino | |
| 7,464,526 B2 | 12/2008 | Coenen | |
| 7,621,112 B2 * | 11/2009 | Slattery | F15B 11/0445 144/429 |
| 7,677,371 B2 | 3/2010 | Dong et al. | |
| 8,527,156 B2 | 9/2013 | Martin et al. | |
| 2013/0247527 A1 | 9/2013 | Brockmann | |
| 2013/0269329 A1* | 10/2013 | Vonderwell | F16H 61/4043 60/327 |

OTHER PUBLICATIONS

Chinese Office Action and English translation dated Jul. 17, 2017 for Chinese Application No. 201480061973.4, 27 pages.
Chinese Office Action dated Jun. 19, 2018 and English translation for Chinese Application No. 201480061973.4, 8 pages.

* cited by examiner

HYDRAULIC BRAKE

CROSS-REFERENCE TO RELATED APPLICATION

This application claims the benefit of U.S. Provisional Application No. 61/903,133, filed Nov. 12, 2013.

FIELD

This application is directed toward hydraulic systems having work elements driven by a hydraulic motor. More particularly, this application is directed toward hydraulic brakes and brake systems for such hydraulic motors.

BACKGROUND

Hydraulic motors are designed to receive a pressurized hydraulic input from a power source and convert it into a rotational output to perform a work task. Hydraulic motors are used in a variety of different applications. One type of application is on a work tool and more particularly, on an implement that is attachable to a power machine. Such implements are capable of receiving a source of pressurized hydraulic fluid from a power machine to perform an intended work function.

Once a hydraulic motor begins to rotate after introduction of the pressurized hydraulic input, it will continue to rotate for a period of time after the pressurized hydraulic input is removed due to momentum of the motor and any rotating work element coupled to the motor. This rotation after removal of the hydraulic input is often times unwanted. To address this unwanted motion, in many applications a hydraulic brake is supplied to overcome the momentum created in the motor and stop it once the pressurized hydraulic input is removed.

The discussion above is merely provided for general background information and is not intended to be used as an aid in determining the scope of the claimed subject matter.

SUMMARY

A hydraulic brake mechanism for use in hydraulic systems to provide braking of a hydraulic motor is disclosed. The brake mechanism provides proper braking under a range of operating conditions, including (1) the start of flow from the pump to the brake and motor and braking is not desired; (2) operating conditions in which constant flow is provided from the pump to the brake and motor and braking is not desired; (3) operating conditions in which abrupt decreases of flow from the pump to the brake and the motor occur, for example where flow is reduced due to being drawn by another work element or hydraulic load, but under which a reduced supply flow is still present and braking is not desired; and (4) operating conditions in which the hydraulic flow from the pump to the brake mechanism and the motor is shut off completely and braking is desired.

In one embodiment, a hydraulic brake mechanism having an inlet configured to be coupled to a power source and an outlet configured to be coupled to a hydraulic motor is disclosed. The hydraulic brake mechanism includes a hydraulic brake and a trigger mechanism. The hydraulic brake is movable between a non-braking position and a braking position in which the hydraulic brake is configured to apply a load for slowing the hydraulic motor. The trigger mechanism is in communication with the hydraulic brake and is configured to detect flow of hydraulic fluid from the power source at the inlet and communicate a brake trigger signal to the hydraulic brake based on the detected flow. When the hydraulic brake is in the non-braking position and the trigger mechanism detects that the flow of hydraulic fluid from the power source has stopped, the brake trigger signal causes the hydraulic brake to move from the non-braking position to the braking position. When trigger mechanism detects that the flow of hydraulic fluid from the power source has been abruptly reduced but not stopped, the brake trigger signal causes the hydraulic brake to remain in the non-braking position.

In another embodiment, a work implement configured to be coupled to a power machine providing a hydraulic power source is disclosed. The work implement includes a work element, a hydraulic motor operably coupled to the work element, and a hydraulic brake mechanism. The hydraulic motor is configured to receive a flow of hydraulic fluid from the power source at a motor input port to drive the work element and to discharge hydraulic fluid at a motor output port. The hydraulic brake mechanism has an input port that can be coupled to the power source to receive the hydraulic fluid to be provided to the motor input port and a brake mechanism output port that can be coupled to the power source to return hydraulic fluid from the motor output port. The hydraulic brake mechanism further includes a hydraulic brake positioned between the motor output port and the brake mechanism output port that is configured to slow the hydraulic motor when a flow of hydraulic fluid from the power source is stopped. A trigger mechanism that is coupled to the hydraulic brake is also included. The trigger mechanism is configured to detect flow of hydraulic fluid from the power source and to prevent the hydraulic brake from slowing the hydraulic motor when the flow of hydraulic fluid from the power source is abruptly reduced but not stopped.

In yet another embodiment, a method of controlling a brake mechanism for braking a hydraulic motor is disclosed. The method includes sensing a first operating condition in which a flow of pressurized hydraulic fluid being provided from a power source that is configured to provide pressurized hydraulic fluid to the motor has abruptly dropped indicating diversion of flow to from a another actuator. When this operating condition is detected, the braking mechanism is prevented from applying a load to the hydraulic motor in the first operating condition.

This Summary is provided to introduce a selection of concepts in a simplified form that are further described below in the Detailed Description.

DETAILED DESCRIPTION

Before any embodiments of the invention are explained in detail, it is to be understood that the concepts disclosed herein are not limited in their application to the details of construction and the arrangement of components set forth in the following description or illustrated in the following drawings. The concepts illustrated in these embodiments are capable of being practiced or of being carried out in various ways. The phraseology and terminology used herein is for the purpose of description and should not be regarded as limiting. Words such as "including," "comprising," and "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Figure 1:
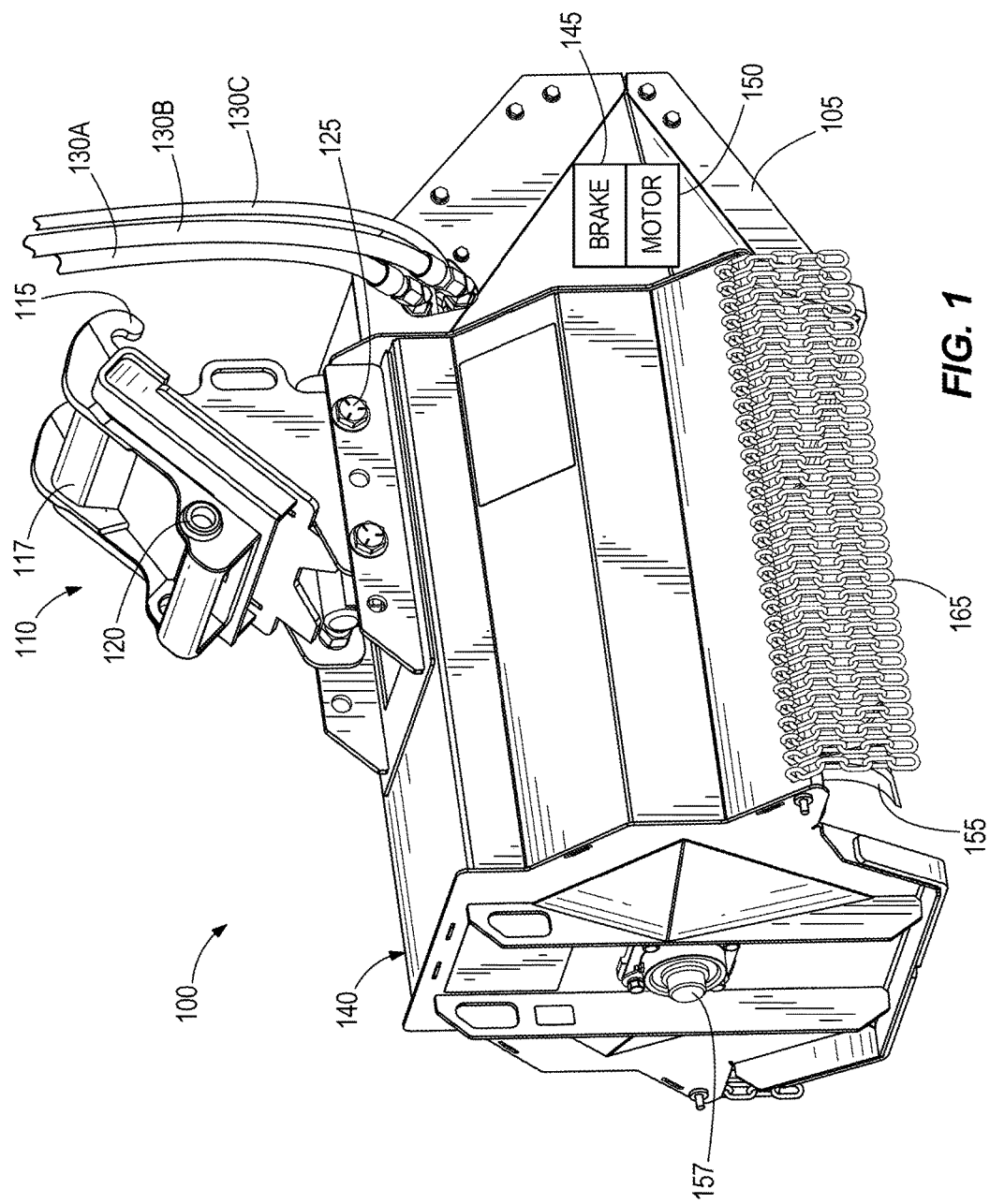
FIG. 1 is a perspective view of a hydraulic motor driven implement which utilizes a brake mechanism in accordance with exemplary embodiments.

The present disclosure is described primarily with reference to hydraulic systems with work elements that are controlled by a hydraulic motor. Further, disclosed embodiments are described with reference to hydraulic brakes for use with such hydraulic systems that perform work tasks. FIG. 1 is a perspective view of a tool that employs a hydraulic motor to perform a work task. More particularly, the tool shown in FIG. 1 is an implement 100 that advantageously employs a hydraulic motor 150 with an improved hydraulic brake 145 according to one illustrative embodiment. Implement 100 is a flail mower implement that is configured to be attached to a power machine (not shown in FIG. 1), in this case an excavator. When attached to a power machine, flail mower 100 (or other implements) can receive power from a power source on the power machine. In other applications, an implement or tool with a hydraulic motor can receive power from any suitable power source and need not be from a power machine to which it is connected, nor should the concepts set forth in this disclosure be understood to be limited to any one implement or tool.

Flail mower 100 shown in FIG. 1 is an implement configured to be attached to excavators. As shown, flail mower 100 includes an attachment mechanism 110 and a tool 140 to which an attachment mechanism 110 is coupled. The attachment mechanism 110 of flail mower is configured to engage with an implement carrier on the lift arm of certain excavators and for the sake of brevity, only this embodiment is shown and discussed. However, in other embodiments of flail mowers and other types of implements different attachment mechanisms can be employed that are configured to be attached to different types of implements including various types of loaders, utility vehicles, tractors, or other types of power machines.

The attachment mechanism 110 has various engagement features for aligning the flail mower 100 with and attaching the flail mower to an implement carrier on an excavator. Included in these attachment features are a pair of hooks 115 (only one is shown in FIG. 1) for aligning the attachment mechanism 110 with an implement carrier during the attachment process, a catch 117 configured to interface with an engagement feature on the implement carrier, and a lock mechanism in the form of a pin receiving aperture 120 for receiving a pin member (not shown) to pin attachment mechanism 110 to the implement carrier. The tool 140 is attached to the attachment mechanism by bolts 125. The tool 140 includes a frame 105 to which various components are attached.

A power source provides power in the form of pressurized hydraulic fluid to flail mower 100. The flail mower 100, like many implements, is configured to be attached to a power machine and receive pressurized hydraulic fluid from a hydraulic power source on the power machine. Some implements or other devices on which features discussed below may be practiced can have their own power supplies. Flail mower 100 includes a set of hydraulic conduits 130A, 130B, and 130C (collectively 130) that are coupleable to individual conduits on a power machine (not shown) to receive (and return) pressurized hydraulic fluid.

Conduits 130A and 130B, as shown in FIG. 1, are flexible hoses that can provide and return hydraulic fluid. Many power machines are capable of providing fluid at either conduit to which conduits 130A and 130B are connected when the flail mower is attached to a power machine. This feature is for providing two different flow directions. Flail mower 100 as shown in FIG. 1 is intended to operate in one direction. The third conduit 130C is known generally as a case drain line and typically provides an additional return path for pressurized hydraulic fluid from the implement.

A hydraulic motor 150 of flail mower 100 receives power from the power source through conduit 130A. A brake 145, an embodiment of which is described below in greater detail, provides hydraulic braking for motor 150 when pressurized hydraulic fluid is no longer being provided through conduit 130A. Motor 150 drives a shaft 157 connected to frame 105. The driven shaft causes blades 155 of flail mower 100 to rotate about the shaft. A guard 165 is also provided to control discharge of material cut by blades 155.

In many power machines, when pressurized fluid is provided to one of conduits 130A and 130B, the hydraulic system on the power machine is configured such that the other of the conduits 130A and 130B is provided a path to tank. When neither of conduits 130A and 130B is provided with pressurized fluid, the hydraulic system on many power machines are configured so that both conduits 130A and 130B are blocked. In some instances, however, power machines will provide a path to tank for conduit 130B at all times and not just when pressurized fluid is being supplied to conduit 130A. The brake 145 is advantageously capable of braking the motor 150 whether or not conduit 130B is blocked or open to tank. The embodiments below are described in relation to an implement and in particular to a flail mower. As mentioned above, however, in other embodiments the brake mechanism and system are used more generally in hydraulic systems without specific reference to any particular implement or use.

Figure 2:
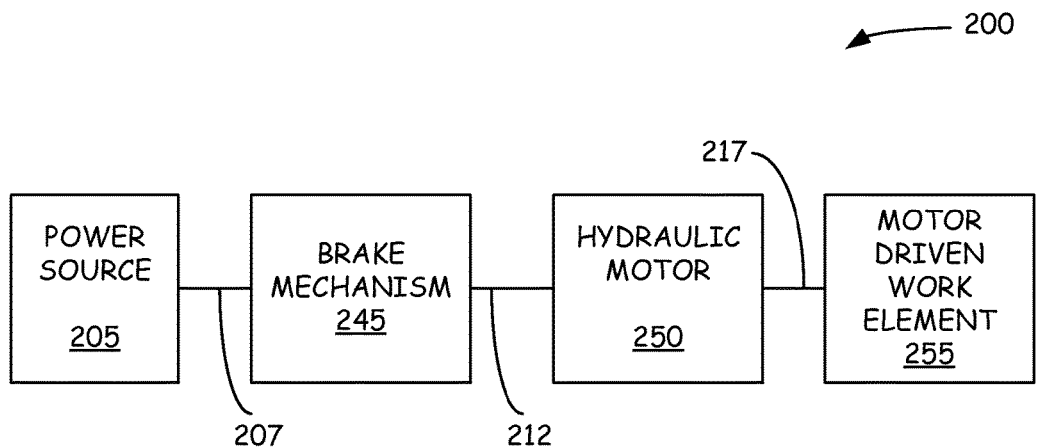
FIG. 2 is a block diagram illustrating a hydraulic system utilizing the brake mechanism in accordance with exemplary embodiments.

Referring now to FIG. 2, shown is a block diagram identifying components of a hydraulic system 200 in which disclosed brake mechanism can be used. Power source 205 provides power in the form of a pressurized hydraulic fluid output 207 to a hydraulic motor 250. In exemplary embodiments, power source 205 is, or includes, a hydraulic pump. Although not specifically designated in FIG. 2, the power source 205 can be provided by a power machine as is discussed above. Power source 205 is configured to receive return fluid from the hydraulic motor 250. In some embodiments, power source 205 provides a return line to a lower pressure reservoir only when pressurized hydraulic fluid is being provided to the hydraulic motor 250. In other embodiment, power source 205 provides a return line to a lower pressure reservoir at all times. Brake mechanism 245 is fluidly coupled between pressurized hydraulic fluid output 207 from the power source 205 and hydraulic motor input 212.

The brake mechanism 245 is configured to provide a braking function when the power source is not providing a pressurized hydraulic fluid signal to hydraulic motor 250. Brake 245 senses a loss of power signal and then applies a braking function. In some instances, however, power source 205 can only provide a reduced level of pressurized hydraulic fluid for a period of time. One such instance on a power machine is when the power source 205 is designed to provide power to work elements such as a lift arm or other devices while also providing a power source to the hydraulic motor 250. In such an instance, it may be advantageous to prevent braking during conditions where the power source 205 provides a temporary reduction in power to the hydraulic motor. As discussed in embodiments below, the brake 245 in at least some embodiments is capable of resisting braking during a reduction, but not loss of a pressurized hydraulic fluid input.

Hydraulic motor 250 drives a work element 255. Output 217 can be a rotated shaft or other forms of hydraulic motor output. As applied to the flail mower implement 100, such a work element would be mower blades.

Figure 3:
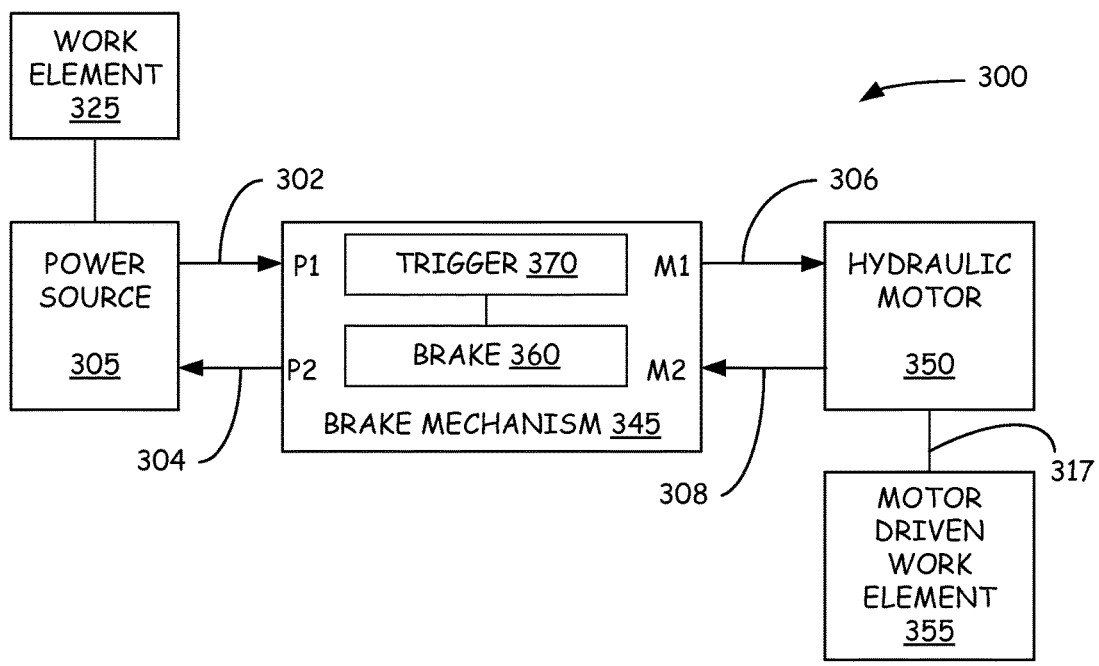
FIG. 3 is a block diagram illustrating another hydraulic system utilizing the brake mechanism in accordance with exemplary embodiments.

FIG. 3 illustrates a block diagram of a hydraulic system 300, which is similar to the hydraulic system shown in FIG. 2. Similar features in FIG. 3 are numbered similarly to those in FIG. 2. The hydraulic system 300 that is shown in FIG. 3 details an embodiment of a brake mechanism in greater detail. Power source 305 provides a power signal 302 in the form of pressurized hydraulic fluid connected to port P1 of brake mechanism 345. Brake mechanism 345 has a return port P2 which connects to a return line 304 to return hydraulic fluid to power source 305. An output port M1 of brake mechanism 345 connects input port P1 to an input line 306 of hydraulic motor 350. A return port M2 of brake mechanism 345 couples return port P2 and return line 304 of power source 305 to return line 308 of hydraulic motor 350.

Hydraulic motor 350 drives a work element 355. Output 317 can be a rotated shaft or other forms of hydraulic motor output. Brake mechanism 345 includes a brake 360 and a trigger 370. Brake 360 is positioned between P2 and M2 and is configured to apply a load to slow (and eventually stop) motor driven work element 355 when flow in from P1 is stopped. The trigger 370 of brake mechanism 345 detects flow into P1 and is configured to prevent brake 360 from applying a load when a reduced flow is provided into P1. Such a reduction may occur when an additional work element 325 (such as an actuator for controlling lift arm on a power machine) draws flow that would otherwise be available at P1. When trigger 370 senses that at least some flow remains at P1, the trigger 370 engages the brake 360 to ensure that the brake 360 is in a condition to not impede actuation of motor driven work element 355. In such a situation, if brake mechanism 345 did not have trigger 370, a reduction in flow due to other loads on power source 305 may cause brake 360 to apply a load to slow or stop the motor 350. Trigger 370 thus advantageously prevents the application of a load unless flow from the power source 305 is stopped.

As discussed above, brake mechanism 345 is capable of maintaining operation of the motor 350 unless hydraulic flow from the power source is interrupted. For the purposes of this discussion, operation of the brake mechanism will be described in terms of its operation under at least four different operating conditions or states, including (1) the start of flow from the pump to the brake and motor; (2) operating conditions in which constant flow is provided from the pump to the brake and motor; (3) operating conditions in which abrupt decreases of flow from the pump to the brake and the motor occur, for example where flow is reduced due to being drawn by another work element or hydraulic load, but under which a reduced supply flow is still present; and (4) operating conditions in which the hydraulic flow from the pump to the brake mechanism and the motor is shut off completely. Hydraulic braking is not desired under the first three of these operating conditions, but it is desired under the fourth. Some conventional brake systems cause braking under one or more of the first three operating conditions when such braking is not desired. Further, some brake mechanisms do not adequately provide braking under all scenarios of the fourth operating condition in which braking is desired. For example, some systems will not brake properly if return line 304 is open to tank at all times. Some existing hydraulic brake systems rely on an alternate control line, different from the supply or return lines to or from the braking circuit to control when the braking function is on or off. In many applications, it is desirable to provide braking only during the fourth operating condition and not to require any other control lines, whether electrical or hydraulic.

Figure 4:
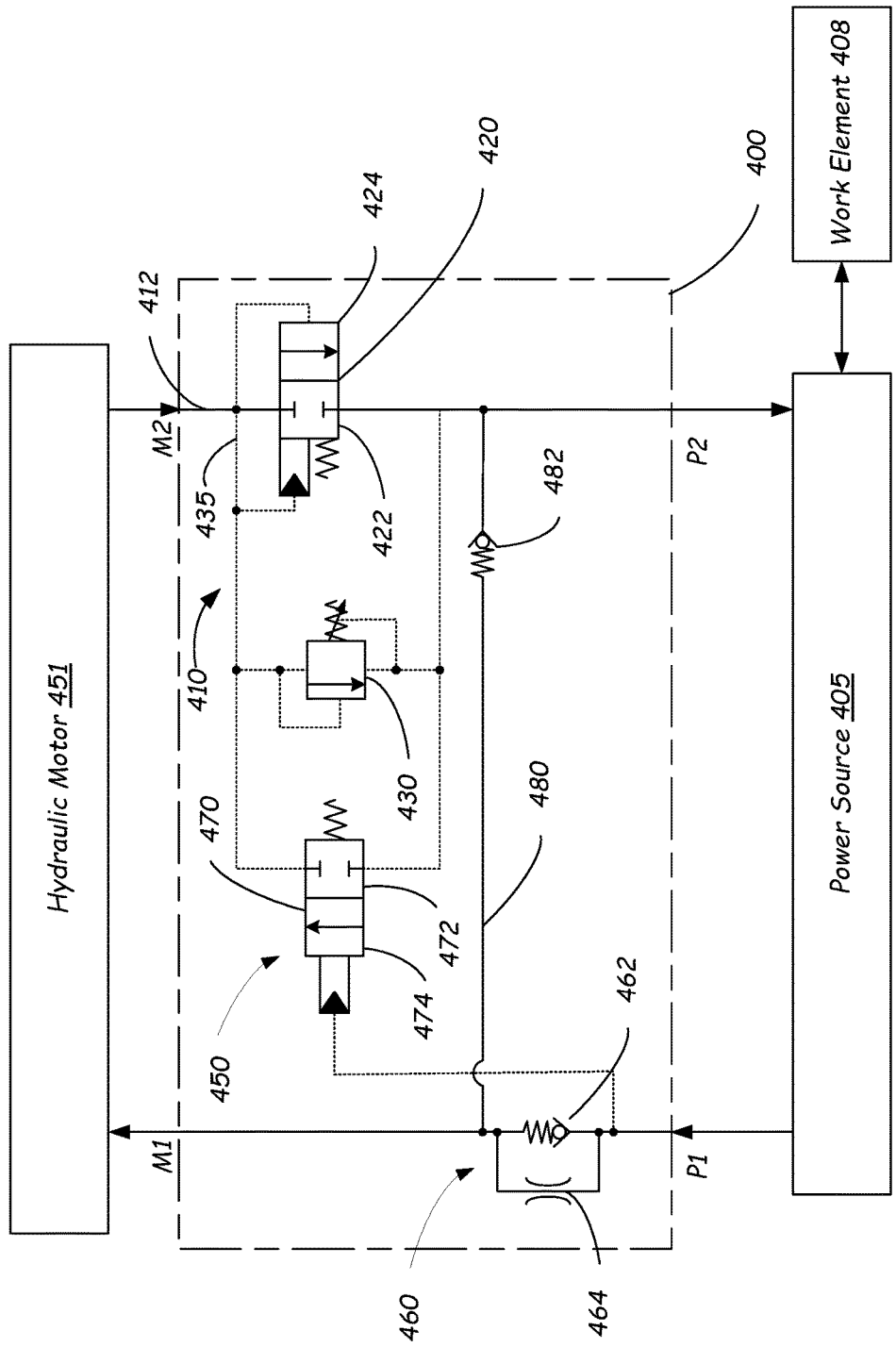
FIG. 4 is a hydraulic circuit diagram illustrating an embodiment of the disclosed brake mechanism.

FIG. 4 is a functional diagram illustrating a brake mechanism 400 having a brake 410 and a trigger 450. Brake mechanism 400 is one embodiment of a brake mechanism of the type illustrated in FIG. 3. To that end, brake mechanism 400 is shown with four ports: P1, P2, M1, and M2. Ports P1 and P2 are configured to receive and return, respectively, pressurized hydraulic fluid from and to a power source 405. Power source 405 is similar to power source 305 shown in FIG. 3 and is also configured to provide power in the form of pressurized hydraulic fluid to work element 408, which is similar to work element 335. Ports M1 and M2 are configured to receive and return, respectively, pressurized hydraulic fluid to and from a motor 451.

Brake 410 operates to slow the motor by providing a load on a return line 412 from M2. Brake 410 includes a brake valve 420, which in the embodiment shown in FIG. 4 is a directional control valve, and a load sense 430, which in the embodiment shown in FIG. 4 is a relief valve. Brake valve 420 is the primary valve that allows flow to return to the power source via P2. Brake valve 420 is movable between a closed position 422, as shown in FIG. 4, and an open position 424. When the brake valve 420 is in the closed position 422, no hydraulic fluid can return to P2. When the brake valve 420 is in an open position 424, flow is allowed to return to a connected power source through P2. When the brake valve 420 is fully open, the motor is allowed to rotate freely, whether because hydraulic fluid is being forced through the motor or because the motor is moving because of previously generated momentum.

Brake valve 420 is biased to the closed position 422 as is shown in FIG. 4. When flow is available at M2, a pressure drop across orifice 435 creates a pressure differential to allow control valve 420 to move to the open position. This is accomplished only when the flow available at M2 is allowed to flow to P2. Load sense 430 provides one path for hydraulic fluid to pass from M2 to P2. Load sense 430 can be any relief valve and can be set to open at any pressure. In one embodiment, load sense 430 is a relief valve that opens when a differential pressure across the relief valve of 1700 psi exists. Thus when the differential pressure across the load sense element 430 reaches 1700 psi, the load sense element opens a regulated amount, which allows flow through the load sense element, which in turn allows brake valve 420 to open a regulated amount. When the brake valve 420 is opened a regulated amount, flow through the brake valve 420 applies a load on the return path of the motor to brake the motor. As will be discussed below, the brake valve 420 is held fully open by a trigger when flow is present at P1. When flow is shut off at P1, brake valve 420 will close. Momentum built up in the motor and motor driven work element will cause the motor to act as a pump to build up pressure, which will cause load sense element to open as discussed above.

As alluded to above, in addition to the brake 410, the brake mechanism 400 includes a trigger 450. Trigger 450 provides a mechanism to shift the brake valve 420 from the closed position 422 to the open position 424 when flow is provided at P1. The trigger 450 includes a pressure buildup mechanism 460 and a trigger valve 470, which is a directional control valve. Trigger valve 470, when opened, provides a path for flow from M2 to tank. Trigger valve 470 is biased to a closed position 472, but when the trigger valve 470 is opened, flow is allowed over orifice 435, and valve 420 moves to the open position 424.

The pressure buildup mechanism 460 includes a check valve 462, which is set to open at a pressure above what is needed to shift the trigger valve 470 from the closed position 472 to the open position 474. In one embodiment, the check valve opens at 40 PSI and the trigger valve 470 shifts to the open position 474 at 20 PSI. Once the trigger valve 470 is in the open position, the valve 420 is opened and allows fluid to pass from M2 to P2 through valve 420. Only a minimal amount of flow is required to keep the check valve 462 open and the trigger valve 470 in the open position 474. Thus, if flow is reduced due to other loads on the power source 305, the motor is not braked as long as sufficient flow is present to keep the trigger valve open. When flow is completely removed from P1, pressure built up by the check valve 462 is relieved through an orifice 464, which thus allows trigger valve 470 to move to the closed position 472 and causes the brake 410 to brake the motor as discussed above. A feedback line 480 from P2 to M1 provides an anti-cavitation feature to supply fluid to the motor, especially during the braking function.

The components described above relative to the brake 410 and the trigger 450 form one embodiment of these mechanisms. In other embodiments, other components can be used to provide these features. Below the operation of the brake mechanism is described with respect to the operating conditions described above.

Operating Condition 1: Start of Flow to the Brake Mechanism

When flow is commanded to port P1, port P2 is opened for return flow. As supply oil is provided to port P1, pressure builds in the pressure buildup mechanism 460 with only a little amount of flow until check valve 462 opens to provide flow to port M2, and provides sufficient pressure to cause the trigger valve 470 to move to the open position 474. When the trigger valve is in the open position 474, flow is allowed from port M2 through the trigger valve 470 to port P2. The flow from port M2 passes through orifice 435, which provides sufficient differential pressure across valve 420 for it to shift to the fully open position 424. With valve 420 in the fully open position, return flow from the motor is allowed to flow out to port P2. Thus, under this first operating condition, no braking occurs.

Operating Condition 2: Constant Flow to the Brake Mechanism

Once supply flow is established into port P1, a minimum pressure remains in the line sufficient to keep the trigger valve 470 in the open position 474. With trigger valve 470 in the open position 474, the brake valve 420 will stay in the fully open position 424 and to allow flow from M2 to flow through port P2. Thus, no braking occurs under this second operating condition.

Operating Condition 3: Abrupt Decreases of Supply Flow to Brake Mechanism with Minimal Supply Flow Present If supply flow at P1 decreases abruptly, but minimal supply flow is still present, sufficient pressure will still be generated to maintain trigger valve 470 in the open position 474. Brake valve 420 will stay in the open position 424 and full system flow from the motor will pass through brake valve 420. Thus, no braking occurs. If the differential pressure between port P2 and port M1 is greater than the pressure setting of a check valve 482 between the two lines, some flow from P2 may circulate back to port M1 through the feedback line 480 to prevent cavitation of the motor. While no braking occurs, the motor speed may decelerate due to a reduced flow from the supply.

Operating Condition 4: Supply Flow from P1 is Stopped

If supply flow at port P1 is shut off completely, the trigger valve 470 moves to the closed position 472. Once trigger valve 470 shifts to the closed position 472, brake valve 420 also shifts to closed position 422. Momentum of the rotating motor driven system results in the motor 350 pumping oil and building pressure at port M2 because there is no open exit path for the oil. During this condition, the motor will begin to brake as discussed above. Once pressure at port M2 reaches the differential pressure setting of the load sense element 430, the load sense element 430 will shift to a regulated position thereby allowing brake valve 420 to open to a regulated position in which pressure at port M2 is maintained near the pressure setting of load sense element 430 until the motor driven system comes to a stop.

The disclosed embodiments provide several important advantages. The trigger is designed to prevent inadvertent braking of the motor during certain conditions, which will improve performance of an implement or other device by avoiding the momentum loss on the implement that accompanies unwanted braking.

Although the present invention has been described with reference to preferred embodiments, workers skilled in the art will recognize that changes may be made in form and detail without departing from the spirit and scope of the invention.

What is claimed is:

1. A hydraulic brake mechanism having an inlet configured to be coupled to a power source including a hydraulic pump and an outlet configured to be coupled to a hydraulic motor, the hydraulic brake mechanism comprising:
   a hydraulic brake movable between a non-braking position and a braking position in which the hydraulic brake is configured to apply a load for slowing the hydraulic motor; and
   a trigger mechanism in communication with the hydraulic brake and configured to detect flow of hydraulic fluid from the power source at the inlet and communicate a brake trigger signal to the hydraulic brake based on the detected flow, the trigger mechanism including a trigger valve in communication with the hydraulic brake and a pressure buildup mechanism in communication with and configured to shift the trigger valve and located between the inlet configured to be coupled to the power source and the outlet configured to be coupled to a hydraulic motor, wherein when the hydraulic brake is in the non-braking position and the trigger mechanism detects that the flow of hydraulic fluid from the power source has stopped, the brake trigger signal causes the hydraulic brake to move from the non-braking position to the braking position, and wherein when trigger mechanism detects that the flow of hydraulic fluid from the power source has been reduced but not stopped, the brake trigger signal causes the hydraulic brake to remain in the non-braking position.

2. The hydraulic brake mechanism of claim 1, wherein the inlet includes a first port configured to be coupled to the power source to receive pressurized hydraulic fluid from the power source and a second port configured to be coupled to the power source to return hydraulic fluid to the power source, wherein the outlet includes a third port configured to be coupled to the motor to provide pressurized hydraulic fluid received at the first port to the motor and a fourth port configured to be coupled to the motor to receive hydraulic fluid from the motor, wherein the hydraulic brake valve is operably coupled between the fourth port and the second port, and wherein the pressure buildup mechanism is in communication with the first port and the trigger valve is in communication with the hydraulic brake and is configured to detect flow of hydraulic fluid from the power source into the first port and to responsively prevent the hydraulic brake from applying the load for slowing the hydraulic motor when flow of hydraulic fluid from the power source into the first port is detected.

3. The hydraulic brake mechanism of claim 2, wherein the pressure buildup mechanism is configured to provide a load sense signal indicative of a pressure caused by hydraulic fluid flow provided at the inlet and in response to a predetermined minimum pressure indicated by the load sense signal, the trigger valve is configured to cause the hydraulic brake valve to move to the non-braking position.

4. The hydraulic brake mechanism of claim 3, wherein the trigger valve is operably coupled between the fourth port and the second port and wherein the hydraulic brake comprises:

a brake valve positionable via a pilot pressure signal; and an orifice operably coupled to the brake valve and configured to cause a differential pressure sufficient to urge the brake valve toward the non-braking position and allow flow of hydraulic fluid through the brake valve when the trigger valve allows flow of hydraulic fluid between the fourth port and the second port.

5. The hydraulic brake mechanism of claim 4, wherein the trigger mechanism and hydraulic brake are configured such that, in response to a reduction in the flow of hydraulic fluid from the power source into the first port, the trigger valve and the brake valve both continue to allow flow of hydraulic fluid between the fourth port and the second port to prevent the application of the load for slowing the hydraulic motor.

6. The hydraulic brake mechanism of claim 5, wherein the trigger mechanism and the hydraulic brake are configured such that, in response to a stoppage in the flow of hydraulic fluid from the power source into the first port, the trigger valve signals the hydraulic brake valve to prevent the flow of hydraulic fluid through the hydraulic brake valve between the fourth port and the second port to build pressure at the fourth port to apply the load to slow the hydraulic motor.

7. The hydraulic brake mechanism of claim 6 and further comprising:

a load sense element operably coupled between the fourth port and the second port and movable from a closed position, wherein applying the load to slow the hydraulic motor, so that a pressure at the fourth port exceeds a differential pressure setting of the load sense element, causes the load sense element between the fourth port and the second port to shift to a regulated position to allow hydraulic fluid flow through the load sense element to thereby cause the brake valve to move to a regulated position in which the pressure at the fourth port is maintained according to the differential pressure setting of the load sense element until the motor comes to a stop.

8. The hydraulic brake mechanism of claim 4, and further comprising an anti-cavitation mechanism coupled between the second port and the third port, the anti-cavitation mechanism configured to allow hydraulic fluid flowing through the brake valve and hydraulic fluid flowing through the trigger valve to circulate back to the third port to prevent cavitation of the motor if differential pressure between the second port and the third port is greater than a predetermined pressure differential.

9. An implement configured to be coupled to a power machine providing a hydraulic power source, the implement comprising:

a frame;

an attachment mechanism coupled to the frame and configured to couple the implement to the power machine;

a work element attached to the frame;

a hydraulic motor operably coupled to the work element and configured to receive a flow of hydraulic fluid from the hydraulic power source at a motor input port to drive the work element and to discharge hydraulic fluid at a motor output port; and a hydraulic brake mechanism having a brake mechanism input port coupleable to the hydraulic power source to receive the hydraulic fluid to be provided to the motor input port and a brake mechanism output port coupleable to the hydraulic power source to return hydraulic fluid from the motor output port, and including:

a hydraulic brake positioned between the motor output port and the brake mechanism output port that is configured to slow the hydraulic motor when a flow of hydraulic fluid from the hydraulic power source is stopped; and a trigger mechanism coupled to and in communication with the hydraulic brake and configured to detect flow of hydraulic fluid from the hydraulic power source and to prevent the hydraulic brake from slowing the hydraulic motor when the flow of hydraulic fluid from the hydraulic power source is reduced but not stopped, the trigger mechanism including a trigger valve in communication with the hydraulic brake and a pressure buildup mechanism in communication with and configured to shift the trigger valve.

10. The implement of claim 9, wherein the trigger mechanism is operably coupled to the brake mechanism input port and is configured to detect flow of hydraulic fluid from the hydraulic power source into the brake mechanism input port and to responsively prevent the hydraulic brake from slowing the hydraulic motor when a flow of hydraulic fluid from the hydraulic power source into the brake mechanism input port is detected.

11. The implement of claim 10, wherein:
the pressure buildup mechanism is operably coupled between the brake mechanism input port and the motor input port and configured to provide a load sense signal indicative of a pressure caused by hydraulic fluid provided at the brake mechanism input port; and
the trigger valve is operably coupled to the hydraulic brake, and wherein in response to a predetermined minimum pressure indicated by the load sense signal, the trigger valve is configured to allow flow of hydraulic fluid between the motor output port and the brake mechanism output port to prevent braking by the hydraulic brake.

12. The implement of claim 11, wherein the hydraulic brake includes a pilot pressure controlled brake valve that is operably coupled between the motor output port and the brake mechanism output port, and
wherein the trigger valve is operably coupled between the motor output port and the brake mechanism output port, and
wherein the hydraulic brake mechanism further comprises:
an orifice operably coupled between the motor output port and the brake valve, and configured to cause a differential pressure between the motor output port and the pilot pressure of the brake valve sufficient to open the brake valve and allow flow of hydraulic fluid through the brake valve when the trigger valve allows flow of hydraulic fluid between the motor output port and the brake mechanism output port.

13. The implement of claim 12, wherein the trigger mechanism and the hydraulic brake are configured such that, in response to a reduction in the flow of hydraulic fluid from the hydraulic power source into the brake mechanism input port which causes a reduction in the pressure indicated by the load sense signal, the trigger valve and the brake valve both continue to allow flow of hydraulic fluid from the motor output port to prevent slowing of the hydraulic motor.

14. The implement of claim 13, and further comprising an anti-cavitation mechanism coupled between the brake mechanism output port and the motor input port, the anti-cavitation mechanism configured to allow hydraulic fluid flowing through the brake valve and hydraulic fluid flowing through the trigger valve to circulate back to the motor input port to prevent cavitation of the motor if differential pressure between the brake mechanism output port and the motor input port is greater than a predetermined pressure differential.

15. The implement of claim 14, wherein the trigger mechanism and the hydraulic brake are configured such that, in response to a stoppage in the flow of hydraulic fluid from the hydraulic power source into the brake mechanism input port, the trigger valve and the brake valve both prevent the flow of hydraulic fluid from the motor output port to build pressure at the motor output port to slow the hydraulic motor.

16. The implement of claim 15, and further comprising:
a load sense element operably coupled between the motor output port and the brake mechanism output port and movable from a closed position; and
wherein if a pressure at the motor output port causes a pressure across the load sense element to exceed a differential pressure setting of the load sense element, the load sense element is urged toward as regulated position to allow hydraulic fluid flow through the load sense element to thereby cause the brake valve to move to a regulated position in which the pressure at the motor output port is maintained according to the differential pressure setting of the load sense element until the motor comes to a stop.

17. The implement of claim 9, and further comprising:
a frame; and
an attachment mechanism coupled to the frame and configured to couple the implement to the power machine.

18. A method of controlling a brake mechanism, configured to brake a hydraulic motor by applying a load to the hydraulic motor, the hydraulic motor having an inlet for receiving pressurized hydraulic fluid from a power source that is configured to provide pressurized hydraulic fluid to a plurality of actuators, and an outlet for returning pressurized hydraulic fluid to the power source, comprising:
using a trigger mechanism, including a trigger valve in communication with the brake mechanism and a pressure buildup mechanism in communication with and configured to shift the trigger valve, configured to sense a flow of pressurized hydraulic fluid being provided from the power source to signal to the braking mechanism an indication of the state of the flow;
sensing a first operating condition in which the flow of pressurized hydraulic fluid being provided from the power source to the hydraulic motor has dropped indicating diversion of flow to another actuator; and
preventing the braking mechanism from applying the load to the hydraulic motor in the first operating condition.

19. The method of claim 18 and further comprising:
sensing a second operating condition in which a flow of pressurized hydraulic fluid being provided from the power source to the hydraulic motor has stopped; and
signaling to the braking mechanism to apply the load.

* * * * *